United States Patent [19]

Mallon

[11] 4,316,830
[45] Feb. 23, 1982

[54] SURFACTANT FREE PROCESS FOR PRODUCTION OF PRESSURE SENSITIVE ADHESIVE LATEXES

[75] Inventor: Charles B. Mallon, Belle Mead, N.J.
[73] Assignee: Union Carbide Corporation, New York, N.Y.
[21] Appl. No.: 122,377
[22] Filed: Feb. 19, 1980
[51] Int. Cl.$^3$ .................... C08L 33/02; C08L 33/06
[52] U.S. Cl. .................... 260/29.6 MQ; 260/29.6 H; 260/29.6 TA
[58] Field of Search ................ 260/29.6 MQ, 29.6 H, 260/29.6 TA

[56] References Cited

U.S. PATENT DOCUMENTS

| | | | |
|---|---|---|---|
| 3,492,260 | 1/1970 | Samour | 260/29.7 |
| 3,882,070 | 5/1975 | Ceska | 260/29.6 MQ |
| 3,922,464 | 11/1975 | Silver | 428/355 |
| 3,931,087 | 1/1976 | Baatz et al. | 260/29.6 SQ |
| 4,110,290 | 8/1978 | Mori et al. | 260/29.6 RW |
| 4,139,514 | 2/1979 | Bassett | 260/29.6 H |

OTHER PUBLICATIONS

Br. Pol. J., 10, 141 (1978).
Br. Pol. J., 10, 173 (1978).
J. Pol. Sc. Pol. Chem. Ed., 17, 3033 (1979).
J. App. Pol. Sc., 19, 3077 (1975), Homola et al.

Primary Examiner—Lorenzo B. Hayes
Assistant Examiner—Amelia B. Yarbrough
Attorney, Agent, or Firm—Francis M. Fazio

[57] ABSTRACT

A process for the production of pressure sensitive adhesive latexes, wherein a surfactant is not employed during the polymerization, comprising the addition of a monomers mix to a free radical initiator capable of producing hydrophilic ionic end groups using a monomers mix that is capable of producing a polymer having a transition glass temperature of from $-70°$ C. to $-20°$ C.

22 Claims, No Drawings

SURFACTANT FREE PROCESS FOR PRODUCTION OF PRESSURE SENSITIVE ADHESIVE LATEXES

BACKGROUND OF THE INVENTION

Pressure sensitive adhesives are soft, permanently tacky polymers designed to adhere to a wide variety of substrates upon application of minimal pressure. These adhesives find wide use in such products as self-adhesive tapes and labels, stickers, wall covering and floor tiles. These adhesives have typically been supplied as polymeric solutions in organic solvents.

In recent years water borne pressure sensitive adhesives have been produced by the adhesives industry. These aqueous latex pressure sensitive adhesives compositions have been gaining wide favor due to their many advantages over organic solvent borne systems. These advantages include a reduction in air pollution and a reduction in fire hazard due to the substitution of water for organic solvent. There are also significant economic advantages as the price of organic solvents continues to increase.

Generally, aqueous latex pressure sensitive adhesives are produced by the use of surfactants in the production process. In a typical reaction a monomer mixture is added to an aqueous surfactant solution and polymerization initiated in a reactor.

These surfactant-based processes have led to the development of pressure sensitive adhesives having good adhesive properties, but these processes have also exhibited certain disadvantages. One problem is that surfactant based processes are complex and difficult to carry out because of the larger number of operations involved and the criticality of the properties of the products on the type and amount of surfactant used. Another disadvantage of surfactant based processes is their tendency to produce scrap; often greater than 0.5 weight percent of the polymer produced. Still another disadvantage is the additional cost of the required surfactants.

A process to produce a latex pressure sensitive adhesive having good adhesive characteristics, which avoids the necessity to employ surfactants, would be of great advantage.

SUMMARY OF THE INVENTION

It has now been found that latex pressure sensitive adhesives, having acceptable combinations of peel and shear properties can be produced without the need to use surfactants in the production process. The process involves the addition of a monomers mix, which will produce a polymer having a glass transition temperature (Tg) of from −70° C. to −20° C., to a reactor containing an aqueous solution of a polymerization initiator which is capable of producing ionic hydrophilic end groups. During the polymerization reaction surfactant is not present in significant amounts in the reactor.

DESCRIPTION OF THE INVENTION

The monomers useful in the surfactant free process of this invention are the acrylic and methacrylic acid esters, having from 4 to 12 carbon atoms, at a concentration of from 40 to 100 weight percent, preferably from 60 to 95 weight percent; the vinyl esters of aliphatic acids, having from 4 to 6 carbon atoms, at a concentration of from 0 to 30 weight percent preferably from 0 to 15 weight percent; the ethylenically unsaturated carboxlyic acids, having from 2 to 6 carbon atoms, at a concentration of from 0 to 20 weight percent, preferably from 1 to 5 weight percent and the polymerizable monoethylenically unsaturated monomers, having from 2 to 8 carbon atoms, at a concentration, of from 0 to 10 weight percent, preferably from 0 to 5 weight percent. One can also have present any of the known crosslinking agents at a concentration of from 0 to 4 weight percent, preferably from 0 to 1 weight percent and any of the known chain transfer agents at a concentration of from 0 to 1 weight percent, preferably from 0 to 0.2 weight percent when either of these materials are present. The percentage figures are based on the total weight of monomers mixture.

Illustrative of suitable acrylic and methacrylic acid esters one can mention n-butyl acrylate, 2-ethylhexyl acrylate, isobutyl acrylate, ethyl acrylate, methyl methacrylate, n-propyl acrylate, isopropyl acrylate, pentyl acrylate, and the like.

Illustrative of suitable vinyl esters one can mention vinyl acetate, vinyl propionate, vinyl butyrate and the like.

Illustrative of suitable ethylenically unsaturated carboxylic acids one can mention acrylic acid, methacrylic acid, itaconic acid, maleic acid, fumaric acid, and the like.

Any of the known polymerizable monoethylenically unsaturated monomers can be used and illustrative thereof one can mention styrene, vinyl chloride and the like.

Illustrative of suitable crosslinkers one can mention N-methylolacrylamide, allyl acrylate, vinyl acrylate, N-isobutoxymethylacrylamide, and the like.

Any combination of monomers can be used in preparing the monomers mix useful in the process of this invention provided that upon completion of the polymerization reaction the resulting polymer has a glass transition temperature (Tg) of from −70° C. to about −20° C., preferably from about −50° C. to about −35° C.

The polymerization initiator useful in the process of this invention is a free radical initiator which is capable of producing a polymer with ionic, hydrophilic end groups at a sufficiently high concentration to produce a stable latex. The stability results from the electrostatic repulsion of the charged groups on a given latex particle with respect to those on the other particles. These initiators are well known to those skilled in the polymerization art and among the many useful initiators one can name potassium persulfate, ammonium persulfate, sodium persulfate and the like. Preferably the initiator is a persulfate initiator.

The initiator is generally present at a concentration of from 0.05 to 1 weight percent, preferably from 0.2 to 0.8 weight percent, based on the total weight of the monomer mix. Those skilled in the art are well aware that the concentration of initiator will vary depending on which initiator is used. The initiator concentration affects the polymer molecular weight; generally the higher the initiator concentration the lower the molecular weight. Lowering the molecular weight results in increased polymer solubility and a change in adhesive properties, usually in the direction of lower shear strengths and higher peel and tack values. These effects are results of the influence of molecular weight on adhesive properties.

The monomers mix is fed to an aqueous solution of the initiator until the desired concentration of polymer in the latex is achieved. The latexes prepared by the process of this invention can contain up to 70 weight percent of polymer, based on the total weight of the latex, preferably from 40 to 60 weight percent.

The monomers feed and polymerization reaction is carried out at a temperature of from 25° C. to 125° C., preferably from 60° C. to 100° C., most preferably from 70° C. to 90° C.

The time of the reaction is not critical, it will vary and will depend upon many variables such as the particular reactants employed, the heat removal capacity of the reactor, the batch size, and such reaction conditions as the monomers mix feed rate, the reaction temperature, and the desired level of polymer concentration in the latex.

The monomers mix is introduced in the polymerization reactor with stirring. The agitation should be fairly slow at the start of the fed to prevent splashing but may have to be increased in the later stages of the reaction if the solids level and viscosity become very high.

As previously indicated the mix can also contain a chain transfer agent, which serves to control the molecular weight of the ppolymer. There are many chain transfer agents known in the art and illustrative of these one can name t-dodecyl mercaptan, butyl mercaptan, bromotrichloromethane and the like. A preferred chain transfer agent, when one is employed, is t-dodecyl mercaptan.

The use of a chain transfer agent is known to lower the polymer molecular weight. Lowering the molecular weight has been found to have a significant effect on the polymer ahdesive properties. As the concentration of chain transfer agent in the monomers mix increases and the molecular weight decreases, the shear strength of the adhesives decreases.

By carefully choosing the concentrations of initiator and, if desired, chain transfer agent, the manufacturer of pressure sensitive latex adhesives produced by the surfactant free process of this invention is afforded great versatility in producing pressure sensitive adhesives having a great variety of quick tack, peel and shear strength combinations, thereby allowing the practitioner to produce adhesives directed to a great variety of end uses; this is indicative of the great utility of the process of this invention.

Generally the latexes prepared by the surfactant free process of this invention will have relatively high surface tension due to the absence of surfactant in the latex. Depending on the application toward which any particular formulation of pressure sensitive latex adhesive is directed, it may be desirable to lower the surface tension and thereby increase the wettability of the latex. One method of accomplishing this result is by the addition of surfactant to the polymer after the polymerization reaction has been completed. This post-surfactant can be introduced in a concentration of up to about 6 weight percent, based on the weight of the polymer. Those skilled in the latex adhesive art are well aware of the very many surfactants which can be employed as post surfactants for the latexes produced by the surfactant free process of this invention. Any of the known surfactants generally used can be added; illustrative of such surfactants one can name nonyl phenol ethoxylates, sodium dodecylbenzene sulfonate, sodium dioctylsulfosuccinate, octyl phenol ethoxylates, octyl phenol ethoxylate sulfates, and the like.

When a post-surfactant is employed, in the above defined concentrations, it is observed that the peel strength of the adhesive generally is increased while the shear strength of the adhesive generally is not significantly adversely affected. This effect is apparently unique to the surfactant free process of this invention and further illustrates the advantages of this process over those heretofore available to the art.

The latexes produced by the surfactant free process of this invention may also contain other additives well known to those skilled in the art which are conventionally present in latexes. The additives can include pH controlling agents, foam control agents, salts and organic solvents and these additives, if used, are present in the conventional concentrations well known to those skilled in the art.

The surfactant free proces of this invention can also be employed to produce pressure sensitives adhesives which are water removable, i.e. completely redispersible in water or such solvents as dilute ammonium hydroxide. It has been found that such adhesives can be produced when the monomers mix is composed of 10 to 20 weight percent or more of the previously mentioned polymerizable ethylenically unsaturated carboxylic acid.

In a typical embodiment of the surfactant free process of this invention, water is charged to a reactor and heated followed by addition of initiator. The monomers mix is then added over a period of time and the mixture is stirred and the temperature maintained at the desired level until completion.

In the surfactant free process of this invention, surfactants or other stabilizers are essentially absent from the reactor during the polymerization reaction. By essentially absent it is meant that minute amounts of surfactant, in such small concentrations that their presence does not result in their having a significantly discernible effect upon the polymerization mixture, may be present. It is well known in the art that small amounts of surfactants can be present in a mixture without essentially affecting the properties of the mixture.

The use of the surfactant free process of this invention to produce latex pressure sensitive adhesives will result in many advantages over the heretofore known processes. Because the surfactant free process of this invention is essentially a one-step process significant economic advantages result over the much more complex surfactant containing processes. A further economic advantage is the avoidance of the need to use costly surfactants. Furthermore, the surfactant free process of this invention generally produces latexes having significantly less scrap and therefore higher yield of desired product than the latexes produced by many of the heretofore known processes.

It was unexpected and unobvious to find that latex pressure sensitive adhesives, having overall good combination of quick track, peel and shear strength properties could be produced by the surfactant free process of the invention which process also allows the production of these useful adhesives in a more economical manner than was heretofore possible by the employment of the known methods.

The following examples serve to further illustrate the invention. In these examples, peel, quick tack and shear were measured according to the Pressure Sensitive Tape Council Standard, PSTC #1, #5, and #7 respectively. Shears were run with a 0.25 square inch bonded area and a 500 gram load. Tapes for testing were prepared by direct coating of the latex on 2 mil mylar film using a #40 wire wound rod to give an adhesive layer thickness of about 1 mil. The tests were conducted on steel substrates.

In the following examples the following abbreviations are used

| | |
|---|---|
| nBA | n-butyl acrylate |
| MMA | methyl methacrylate |
| AA | acrylic acid |
| VA | vinyl acetate |
| EA | ethyl acrylate |
| tDM | t-dodecyl mercaptan |
| tBP | t-butyl perbenzoate |
| tBHP | t-butyl hydroperoxide |
| SFS | sodium formaldehyde sulfoxylate |
| C | cohesive failure - within the adhesive polymer |
| A | adhesive failure - at the adhesive/substrate interface |
| A/C | mixed failure |
| AM | adhesive failure at Mylar at the adhesive/Mylar interface |
| TS | Total Solids |
| PPS | Potassium Persulfate |

EXAMPLE 1

There were charged to a 3 liter reactor, equipped with an agitator, condenser, thermometer and temperature control device, 390 grams of deionized water and 2 grams of sodium bicarbonate. The reactor contents were heated to 80° C. and there was added 3.5 grams of potassium persulfate, which corresponded to 0.6 weight percent based on the weight of the monomers. A monomers mix composed of 546 grams of n-butyl acrylate, 30 grams of methyl methacrylate and 24 grams of acrylic acid was fed to the reactor at a rate of 2.5 grams/min for a total time of 4 hours. During the monomers feed the reactor contents were constantly stirred and were kept at a temperature of from 80° C. to 85° C. After the monomers feed was completed, the reactor contents were stirred at from 80° C. to 85° C. for 30 minutes then cooled to from 60° C. to 70° C.

There were then added 2.2 grams of t-butyl perbenzoate followed by the slow addition of 2.2 grams of soduim formaldehyde sulfoxylate in 20 grams of water as post-catalyst. The resulting polymer had a composition of 91/5/4-nBA/MMA/AA and a Tg of −40° C. There were also added 3 weight percent based on the total weight of the monomers of a nonyl phenol ethoxylate as post-surfactant.

This procedure was repeated two more times with the exception that each of these runs contained a specified amount of t-dodecyl mercaptan, as chain transfer agent, in the monomers mix added to the reactor. The resulting adhesive compositions were applied to mylar film and tested. The results are reported in Table I.

TABLE I

| Run | tDM (ppm) | Peel (pli) | Shear (hrs) |
|---|---|---|---|
| 1 | 0 | 3 A | 87 |
| 2 | 1000 | 5.2 C | 2 |
| 3 | 2000 | 2.6 C | 0.5 |

The data demonstrate that latex pressure sensitive adhesives prepared by the surfactant free process of this invention display an excellent balance of peel and shear strength. This example also demonstrates that a variety of peel and shear strength combinations can be obtained by varying the amount of chain transfer agent used, thus enabling the manufacturer wider flexibility in producing pressure sensitive adhesives having particular desired combinations of peel and shear strengths.

EXAMPLE 2

This example illustrates the process of this invention carried out with three different concentrations of potassium persulfate initiator each different from the concentration employed in Example 1. Generally, a decrease in initiator concentration resulted in an increase in the polymer molecular weight.

Three pressure sensitive adhesives were produced using a process similar to that described in Example 1. A similar monomers mixed was employed and the resulting polymer was similar to that obtained in Example 1 except that the initiator concentration was changed. One latex was produced using initiator at a concentration of 0.3 weight percent, another latex was produced using initiator at a concentration of 0.15 weight percent and a third latex was produced using initiator at a concentration of 0.08 weight percent. Each run had the indicated amount of t-dodecyl mercaptan. Tapes were prepared and tested and results are reported in Table II.

TABLE II

| Run | tDM (ppm) | PPS (wt %) | Peel (pli) | Shear (hrs) |
|---|---|---|---|---|
| 1 | 1000 | 0.3 | 3.1 A | 1.2 |
| 2 | 1000 | 0.15 | 1.5 A | 4.5 |
| 3 | 1000 | 0.08 | 2.4 A | 2.2 |

This example demonstrates the great versatility of the process of this invention. The practitioner of the art of formulating latex pressure sensitive adhesives can, by varying the amounts of chain transfer agent and/or initiator, produce pressure sensitive adhesives having a wide variety of peel and shear strengths to meet his needs.

EXAMPLE 3

This example demonstrates that latex pressure sensitive adhesives prepared by the surfactant free process of this invention have less scrap than is presently achievable by many known methods of preparing these adhesives.

A pressure sensitive adhesive was produced using the process and monomer concentrations described in Example 1. The concentration of chain transfer agent is indicated in Table III.

The latex was evaluated as to floating scrap and total scrap. Floating scrap is anything that will be filtered out by passing the latex though cheesecloth; total scap includes polymeric material stuck to the agitator, thermometer and reactor at the end of the polymerization. The latex was also evaluated as to filterable solids (seeds) by passage through a 100 mesh screen. The results are shown in Table III.

TABLE III

| tDM (ppm) | Floating (grams) | Total (grams) | % of Total Chg. | Seeds (ppm) |
|---|---|---|---|---|
| 250 | 0 | 2 | 0.2 | 101 |

Typical scrap levels for methods of formulating latex pressure sensitive adhesives generally exceed 1-3 percent in lab scale runs. As can be seen from the results of this example, pressure sensitive latex adhesives are produced with significantly less scrap than what can typically be achieved using known methods.

EXAMPLE 4

Two pressure sensitive adhesives were produced using a process similar to that described in Example 1 except that the monomers mix was composed of 546 grams of of n-butyl acrylate, 30 grams of vinyl acetate and 24 grams of acrylic acid. The resulting polymer had a composition of 91/5/4-nBA/VA/AA and a Tg of $-40°$ C. Two more pressure sensitive adhesives were produced using a similar procedure except that the monomers mix was composed of 486 grams of n-butyl acrylate, 90 grams of vinyl acetate and 24 grams of acrylic acid. The resulting polymer had a composition of 81/15/4-nBA/VA/AA and a Tg of $-35°$ C.

Tapes were prepared and tested and the results are reported in Table IV.

TABLE IV

| Run | Polymer Composition | tDM (ppm) | TS (%) | Peel (pli) | Shear (hrs) |
|---|---|---|---|---|---|
| 1 | 91/5/4 | 0 | 55 | 6.4 C | 18 |
| 2 | 91/5/4 | 0 | 60 | 5.6 C/A | 12 |
| 3 | 81/15/4 | 0 | 55 | 6.7 C | 62 |
| 4 | 81/15/4 | 1000 | 55 | 5.4 C | 0.5 |

This example further demonstrates the utility of the surfactant free process of this invention, in particular by showing its versatility with a variety of polymer compositions.

EXAMPLE V

A pressure sensitive adhesive was produced using a process similar to that descrived in Example 1 except that the monomers mix was composed of 360 grams of n-butyl acrylate, 216 grams of ethyl acrylate and 24 grams of acrylic acid. The resulting polymer had a composition of 60/36/4-nBA/EA/AA and Tg of $-40°$ C. Another pressure sensitive adhesive was produced using a similar procedure except that the monomers mix was composed of 288 grams n-butyl acrylate, 288 grams of ethyl acrylate and 24 grams of acrylic acid. The resulting polymer had a composition of 48/48/4-nBA/EA/AA and a Tg of $-35°$ C. Neither of the latex adhesives contained a chain transfer agent.

Tapes were prepared and tested and the results are reported in Table V.

TABLE V

| Run | Polymer Composition | TS (%) | Peel (pli) | Shear (hrs) |
|---|---|---|---|---|
| 1 | 60/36/4 | 60 | 6.8 C | 15 |
| 2 | 48/48/4 | 60 | 6.1 C | 8 |

This example further demonstrates that one can produce adhesive compositions having good combinations of peel and shear strengths with a variety of polymer compositions by use of the surfactant free process of this invention.

EXAMPLE 6

This example illustrates the use of the surfactant free process of this invention to produce pressure sensitive adhesives having a high carboxylic acid content. These adhesives are generally easily removable by water and find use as adhesives for labels on various household products.

Three pressure sensitive adhesives were prepared using a process similar to that described in Example 1. They were prepared from a monomer mix composed of 510 grams of n-butyl acrylate and 90 grams of acrylic acid to give a polymer having a composition of 85/15-nBA/AA and having a Tg of $-40°$ C. Each adhesive was prepared using 2000 ppm of t-dodecyl mercaptan as a chain transfer agent; run 1 had no post-surfactant added to the latex, runs 2 and 3 had 3 weight percent of a nonyl phenol ethoxylate and sodium dodecylbenzene sulfonate respectively added as postsurfactant.

The adhesives were tested for tack and redispersibility. Redispersibility was evaluated by placing a drop of water or dilute ammonium hydroxide on the polymer film; if the film turned white within about 30 seconds it was rated as having good redispersibility. In Table VI, + indicated good tack or redispersibility, − indicates no tack or redispersibility, sl indicates slight. Samples were either air dried or oven baked for 5 minutes at 150° C. before testing. The results of these tests are reported in Table VI.

TABLE VI

| | | Air Dry | | | Oven Bake | |
|---|---|---|---|---|---|---|
| | Polymer | | Redispers | | | Redispers |
| Run | Composition | Tack | H$_2$O | NH$_4$OH | Tack | H$_2$O | NH$_4$OH |
| 1 | 85/15 | − | + | + | − | + | + |
| 2 | " | − | + | + | + | − | + |
| 3 | " | + | + | + | + | + | + |

The results show that the process of this invention can be employed to produce high acid containing pressure sensitive adhesives which can be redissolved in water or dilute ammonium hydroxide.

EXAMPLE 7

This example illustrates the effect on adhesive properties of post-surfactant added to the latexes prepared by the surfactant free process of this invention. Two latex adhesives were prepared following a procedure similar to that described in Example 1 except that the monomers mix was composed of 546 grams of n-butyl acrylate, 30 grams of vinyl acetate, and 24 grams of acrylic acid to give a polymer having a composition of 91/5/4-nBA/VA/AA and Tg of $-40°$ C.; there was no chain transfer agent employed. The latex of Run 1 received no post-surfactant treatment; the latex of Run 2 had added thereto 3 weight percent, based on polymer weight, of a nonyl phenol ethoxylate as post-surfactant.

Tapes were prepared and tested and the results are shown in Table VII.

TABLE VII

| Run | Peel (pli) | Shear (hrs) |
|---|---|---|
| 1 | 3.4 A | 20 |
| 2 | 5.5 A, 6.4 C | 18 |

These results further exemplify the beneficial effects on adhesive properties resulting from the post-surfactant addition to the latex pressure sensitive adhesives prepared by the surfactant free process of this invention.

What is claimed is:

1. A process for the production of pressure sensitive adhesive latexes having a glass transition temperature of from −70° C. to −20° C., said process characterized by the essential absence of surfactants or other stabilizers during the polymerization reaction, comprising the reaction at from 25° C. to 125° C. of
(I) a monomer mix comprising
   (A) from 40 weight percent to 100 weight percent of at least one acrylic or methacrylic acid ester;
   (B) from 0 weight percent to 30 weight percent of at least one vinyl ester of an aliphatic acid; and
   (C) from 0 weight percent to 20 weight percent of at least one ethylenically unsaturated carboxylic acid;
   wherein the concentrations are based on the total weight of the monomers mix; and
(II) from 0.05 weight percent to 1 weight percent based on the total weight of the monomers mix of a polymerization initiator capable of producing hydrophilic ionic end groups;
said reaction occuring in the presence of sufficient water such that the resulting latex has a polymer concentration not exceeding 70 weight percent of the total weight of the latex.

2. A process as claimed in claim 1 wherein said reaction is carried out at a temperature of from 60° C. to 100° C.

3. A process as claimed in claim 1 wherein said reaction is carried out at a temperature of from 70° C. to 90° C.

4. A process as claimed in claim 1 wherein there is additionally present a chain transfer agent at a concentration up to 0.5 weight percent.

5. A process as claimed in claim 4 wherein said chain transfer agent is t-dodecyl mercaptan.

6. A process as claimed in claim 1 wherein there is added to the latex adhesive after the copolymerization reaction, up to 6 weight percent, based on the polymer weight, of a post-surfactant.

7. A process as claimed in claim 1 wherein said initiator (II) is present at a concentration of from 0.05 weight percent to 1 weight percent.

8. A process as claimed in claim 1 wherein said initiator (II) is potassium persulfate.

9. A pressure sensitive adhesive latex, characterized by the essential absence of surfactants or other stabilizers in the latex, having glass transition temperature of from −70° C. to −20° C., said latex containing up to 70 weight percent, based on the weight of said latex, of a polymer comprised of
(A) from 40 weight percent to 100 weight percent of at least one acrylic or methacrylic ester;
(B) from 0 weight percent to 30 weight percent of at least one vinyl ester of an aliphatic acid;
(C) from 0 weight percent to 20 weight percent of at least one ethylenically unsaturated carboxylic acid;
wherein the concentrations of component (A)−(C) are based on the total weight of said polymer.

10. A pressure sensitive adhesive latex as claimed in claim 9 wherein said glass transition temperature is from −50° C. to −35° C.

11. A pressure sensitive adhesive latex as claimed in claim 9 wherein said polymer is present in a concentration of from 40 to 60 percent.

12. A pressure sensitive adhesive latex as claimed in claim 9 wherein component (A) of said polymer is present in a concentration of from 60 to 95 weight percent.

13. A pressure sensitive adhesive latex as claimed in claim 9 wherein component (B) of said polymer is present in a concentration of from 0 to 15 weight percent.

14. A pressure sensitive adhesive latex as claimed in claim 9 wherein component (C) of said polymer is present in a concentration of from 1 to 5 weight percent.

15. A pressure sensitive adhesive latex as claimed iin claim 9 wherein said polymer is composed of 91 weight percent n-butyl acrylate, 5 weight percent methyl methacrylate and 4 weight percent acrylic acid.

16. A pressure sensitive adhesive latex as claimed in claim 9 wherein said polymer is composed of 91 weight percent n-butyl acrylate, 5 weight percent vinyl acetate and 4 weight percent acrylic acid.

17. A pressure sensitive adhesive latex as claimed in claim 9 wherein said polymer is composed of 81 weight percent n-butyl acrylate, 15 weight percent vinyl acetate and 4 weight percent acrylic acid.

18. A pressure sensitive adhesive latex as claimed in claim 9 wherein said polymer is composed of 60 weight percent n-butyl acrylate, 36 weight percent ethyl acrylate and 4 weight percent acrylic acid.

19. A pressure sensitive adhesive latex as claimed in claim 9 wherein said polymer is composed of 48 weight percent n-butyl acrylate, 48 weight percent ethyl acrylate and 4 weight percent acrylic acid.

20. A pressure sensitive adhesive latex as claimed in claim 9 wherein said polymer is composed of 85 weight percent n-butyl acrylate and 15 weight percent acrylic acid.

21. A pressure sensitive adhesive composition comprising a latex as claimed in claim 9 and up to 6 weight percent, based on the polymer weight, of a surfactant.

22. A pressure sensitive adhesive composition as claimed in claim 21 wherein the said surfactant is a nonyl phenol ethoxylate.

* * * * *